(12) United States Patent  (10) Patent No.: US 11,336,123 B2
Choi  (45) Date of Patent: May 17, 2022

(54) DISPLAY APPARATUS AND CONTROL METHOD THEREOF

(71) Applicant: SAMSUNG ELECTRONICS CO., LTD., Suwon-si (KR)

(72) Inventor: Youngho Choi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/992,969

(22) Filed: Aug. 13, 2020

(65) Prior Publication Data

US 2021/0050745 A1  Feb. 18, 2021

(30) Foreign Application Priority Data

Aug. 14, 2019 (KR) .......................... 10-2019-0099869

(51) Int. Cl.
*H02J 50/40* (2016.01)
*H02J 50/12* (2016.01)
(Continued)

(52) U.S. Cl.
CPC ............... *H02J 50/12* (2016.02); *G06F 3/14* (2013.01); *G06F 3/162* (2013.01); *H01F 38/14* (2013.01);
(Continued)

(58) Field of Classification Search
CPC . H02J 50/12; H02J 50/80; H02J 50/40; G06F 3/14; G06F 3/162; H01F 38/14;
(Continued)

(56) References Cited

U.S. PATENT DOCUMENTS 4,535,870 A * 8/1985 Lindsay ................ H04B 1/088
 181/141
4,549,179 A * 10/1985 Stendardo ................ H03G 1/02
 340/12.22
(Continued)

FOREIGN PATENT DOCUMENTS

EP  2661100 A1  11/2013
JP  2012-501593 A  1/2012
(Continued)

OTHER PUBLICATIONS

Written Opinion (PCT/ISA/237) issued by the International Searching Authority in corresponding International Application No. PCT/KR2020/010732, dated Nov. 17, 2020.
(Continued)

*Primary Examiner* — Pinping Sun
(74) *Attorney, Agent, or Firm* — Sughrue Mion, PLLC

(57) ABSTRACT

A display apparatus is provided. The display apparatus includes a power supply; a connection interface; and a processor configured to: identify whether a device connected to the connection interface comprises a speaker or a wireless power transmitter, based on the device being identified as comprising the speaker, provide power supplied from the power supply and a sound signal to the speaker, and based on the device being identified as comprising the wireless power transmitter, provide power supplied from the power supply to the wireless power transmitter.

20 Claims, 13 Drawing Sheets

(51) Int. Cl.
*H02J 50/80* (2016.01)
*G06F 3/14* (2006.01)
*G06F 3/16* (2006.01)
*H01F 38/14* (2006.01)
*H04R 1/02* (2006.01)

(52) U.S. Cl.
CPC .............. *H02J 50/40* (2016.02); *H02J 50/80* (2016.02); *H04R 1/025* (2013.01); *H04R 2499/15* (2013.01)

(58) Field of Classification Search
CPC ............... H04R 1/025; H04R 2499/15; H04R 2205/021; H04R 3/00; H04R 1/02; H04R 2420/05; H04R 2420/07; H04N 5/642; H04N 5/63
See application file for complete search history.

(56) References Cited

U.S. PATENT DOCUMENTS

| | | | |
|---|---|---|---|
| 8,073,503 B2 | 12/2011 | Hoefel et al. | |
| 8,477,280 B2* | 7/2013 | Yokonuma | G09G 3/3655 349/152 |
| 9,386,367 B2* | 7/2016 | Onishi | H04M 1/0254 |
| 9,706,307 B2 | 7/2017 | Yoon et al. | |
| 9,784,878 B2* | 10/2017 | Yamamoto | H04B 5/0081 |
| 10,581,278 B2 | 3/2020 | Choi et al. | |
| 10,700,544 B2 | 6/2020 | Park et al. | |
| 2004/0196985 A1* | 10/2004 | Kokubo | H04M 1/6033 381/79 |
| 2008/0080730 A1* | 4/2008 | Takakusaki | H04R 5/02 381/300 |
| 2010/0058384 A1 | 3/2010 | Mortensen | |
| 2011/0018360 A1* | 1/2011 | Baarman | H02J 50/40 307/104 |
| 2013/0101133 A1 | 4/2013 | Yoon et al. | |
| 2014/0149615 A1* | 5/2014 | Fosse | G06F 13/4068 710/110 |
| 2014/0375256 A1* | 12/2014 | Lee | H02J 50/12 320/108 |
| 2016/0111028 A1 | 4/2016 | Lee et al. | |
| 2018/0159359 A1 | 6/2018 | Park et al. | |
| 2018/0233961 A1* | 8/2018 | Hu | H02J 7/025 |
| 2018/0351408 A1 | 12/2018 | Lee | |
| 2019/0067996 A1* | 2/2019 | Choi | H01F 27/38 |
| 2019/0235583 A1* | 8/2019 | Kang | G06F 1/1683 |

FOREIGN PATENT DOCUMENTS

| | | | |
|---|---|---|---|
| JP | 2021-90167 A | 6/2021 | |
| KR | 10-1297718 B1 | 8/2013 | |
| KR | 101423028 B1 | 7/2014 | |
| KR | 10-2016-0017626 A | 2/2016 | |
| KR | 10-2016-0087110 A | 7/2016 | |
| KR | 1020170106083 A | 9/2017 | |
| KR | 101808086 B1 | 12/2017 | |
| KR | 1020190021147 A | 3/2019 | |
| WO | 2013069951 A1 | 5/2013 | |
| WO | WO-2015155242 A1 * | 10/2015 | ......... G06F 13/4295 |
| WO | 2019039684 A1 | 2/2019 | |

OTHER PUBLICATIONS

International Search Report (PCT/ISA/210), issued by International Searching Authority in corresponding International Application No. PCT/KR2020/010732, dated Nov. 17, 2020.

Communication dated Jan. 14, 2021, from the European Patent Office in counterpart European Application No. 20190913.2.

* cited by examiner

DISPLAY APPARATUS AND CONTROL METHOD THEREOF

CROSS-REFERENCE TO RELATED APPLICATION

This application is based on and claims priority under 35 U.S.C. § 119 to Korean Patent Application No. 10-2019-0099869, filed on Aug. 14, 2019, in the Korean Intellectual Property Office, the disclosure of which is incorporated by reference herein in its entirety.

BACKGROUND

1. Field

The disclosure relates to a display apparatus and a control method thereof, and more particularly to a display apparatus including a detachable speaker and a control method thereof.

2. Description of Related Art

In recent years, various types of electronic apparatuses have been developed and distributed with development of electronic technologies. Particularly, with the development of various types of acoustic equipment such as a sound bar, a display apparatus may output a video signal, and a high-quality audio signal may be output via an external speaker apparatus such as a sound bar.

An external speaker apparatus requires power to operate. If the display apparatus is a wall-mounted type, cables (e.g., power cables) connecting the display apparatus and the external speaker apparatus at the wall may be exposed and affect the look of a room.

If the display apparatus wirelessly provides power to the external speaker, production cost and weight may increase due to a wireless power transmitter.

The display apparatus does not need to include the wireless power transmitter when the external speaker apparatus such as a sound bar is not used, and therefore, a technology of attaching the wireless power transmitter only when the wireless power transmitter is necessary has been required to prevent an increase in production cost.

SUMMARY

The disclosure has been made according to the aforementioned needs, and one or more embodiments provide a display apparatus providing power to an external speaker apparatus in wireless manner using a detachable speaker and a detachable wireless power transmitter, and a control method thereof. Embodiments of the disclosure overcome the above disadvantages and other disadvantages not described above. Also, the disclosure is not required to overcome the disadvantages described above, and an embodiment of the disclosure may not overcome any of the problems described above. Additional aspects of the disclosure will be set forth in part in the description which follows and additional aspects will be apparent from the description, or may be learned by practice of the disclosure.

In accordance with an aspect of the disclosure, there is provided a display apparatus that includes: a power supply; a connection interface; and a processor configured to: identify whether a device connected to the connection interface comprises a speaker or a wireless power transmitter, based on the device being identified as comprising the speaker, provide power supplied from the power supply and a sound signal to the speaker, and based on the device being identified as comprising the wireless power transmitter, provide power supplied from the power supply to the wireless power transmitter.

The display apparatus may include a communication interface, and the processor may be further configured to: based on the device being identified as comprising the wireless power transmitter, control the communication interface to perform a pairing operation with an external speaker apparatus, and control the communication interface to transmit the sound signal to the external speaker apparatus.

The wireless power transmitter may include a resonator is configured to transmit power supplied from the power supply to a wireless power receiver of the external speaker apparatus using the resonator.

The resonator may include a first helical inductor and a second helical inductor. A coil of the first helical inductor may be wound in a first direction and may be connected to an the second helical inductor. A coil of the second helical inductor may wound in a second direction that is different from the first direction.

The resonator may include a magnetic body that exposes an exposed area of the resonator, and the resonator may be attached to the display apparatus so that the exposed area is exposed outside of the display apparatus.

Each of the speaker and the wireless power transmitter may include an interface compatible with the connection interface, and the processor may be further configured to, based on the speaker being detached from the connection interface and the wireless power transmitter being connected to the connection interface, control the connection interface to provide power for driving the speaker supplied from the power supply to the wireless power transmitter.

The display apparatus may include a communication interface. The processor may be further configured to, based on a signal indicating attachment of the wireless power transmitter being received, control the communication interface to perform a pairing operation with an external speaker apparatus and transmit the sound signal to the external speaker apparatus.

The connection interface may include a first connection interface and a second connection interface, and the processor may be further configured to, based on a first wireless power transmitter and a second wireless power transmitter being connected to the first connection interface and the second connection interface, respectively, provide a first power supplied from the power supply to the first wireless power transmitter and provide a second power to the second wireless power transmitter.

A first resonator provided in the first wireless power transmitter may include a first helical inductor and a second helical inductor, a coil of the first helical inductor may be wound in a first direction and may be connected to a coil of the second helical inductor, the coil of the second helical inductor may be wound in a second direction that is different from the first direction, a second resonator provided in the second wireless power transmitter may include a third helical inductor and a fourth helical inductor, a coil of the third helical inductor may be wound in the second direction and may be connected to a coil of the fourth helical inductor, the coil of the fourth helical inductor may be wound in the first direction, and magnetic flux directions of the first resonator and the second resonator may be different from each other.

The processor may be further configured to transmit a clock signal to the first wireless power transmitter to control driving timing of the first wireless power transmitter and the second wireless power transmitter.

The connection interface may be disposed in a space defined by a main body of the display apparatus, the display apparatus may further include: a button; and a driver configured to detach the device based on the button being manipulated, and the driver may be configured to, based on the button being manipulated, push the device attached from the space.

The display apparatus may further include a communication interface, and the processor may be configured to, based on the device being identified as the wireless power transmitter while an internal speaker is also connected to the connection interface, inactivate the internal speaker, and control the connection interface to provide power for driving an external speaker apparatus to the wireless power transmitter and control the communication interface to transmit the sound signal to the external speaker apparatus.

In accordance with another aspect of the disclosure, there is provided a method for controlling a display apparatus, the method includes: identifying a device connected to the display apparatus that comprises a speaker or a wireless power transmitter; based on the device being identified as comprising the speaker, providing power and a sound signal to the speaker; and based on the device being identified as comprising the wireless power transmitter, providing power to the wireless power transmitter.

The method may further include: based on the device being identified as comprising the wireless power transmitter, performing a pairing operation with an external speaker apparatus; and transmitting the sound signal to the external speaker apparatus.

The wireless power transmitter may include a resonator, and the method may further include transmitting power to a wireless power receiver of the external speaker apparatus using the resonator.

The resonator may include a first helical inductor and a second helical inductor, a coil of the first helical inductor may be wound in a first direction and may be connected to the second helical inductor, and a coil of the second helical inductor may be wound in a second direction that is different from the first direction.

The resonator may include a magnetic body that exposes an exposed area of the resonator, and the resonator may be attached to the display apparatus so that the exposed area is exposed outside of the display apparatus.

The providing power to the wireless power transmitter may include: based on the speaker being detached from the display apparatus and the wireless power transmitter being connected to the display apparatus, providing power for driving the speaker to the wireless power transmitter.

The method may further include, based on a signal indicating attachment of the wireless power transmitter being received, performing a pairing operation with an external speaker apparatus and transmitting the sound signal to the external speaker apparatus.

The may further include identifying whether another wireless power transmitters is connected to the display apparatus; and based on the other wireless power transmitter being identified as being connected, providing power to the other wireless power transmitter.

In accordance with another aspect of the disclosure, there is provided a display apparatus including: a power supply; a speaker; a communication interface; a connection interface; and a processor configured to: identify whether a wireless power transmitter is connected to the connection interface, based on the wireless power transmitter not being connected to the connection interface, provide a sound signal to the speaker, and based on the wireless power transmitter being connected to the connection interface, provide the sound signal to the communication interface.

The processor may be further configured to not provide the sound signal to the speaker based on the wireless power transmitter being connected to the connection interface.

The processor may be further configured to provide power supplied from the power supply to the connection interface based on the wireless power transmitter being connected to the connection interface.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1:
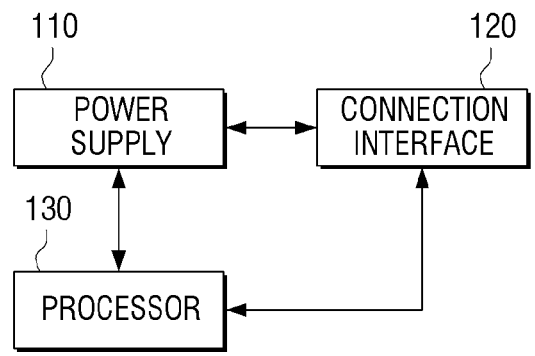
FIG. 1 is a block diagram illustrating a configuration of a display apparatus according to an embodiment.

Embodiments will be described in detail after briefly explaining the terms used in the specification.

The terms used in embodiments of the disclosure have been selected as widely used general terms in consideration of functions in the disclosure, but these may vary in accordance with the intention of those skilled in the art, the precedent, the emergence of new technologies and the like. In addition, in a certain case, there is also a term arbitrarily selected by the applicant, in which case the meaning will be described in detail in the description of the disclosure. Therefore, the terms used in the disclosure should be defined based on the meanings of the terms themselves and the contents throughout the disclosure, rather than the simple names of the terms.

The embodiments of the disclosure may be variously changed and include various embodiments, and specific embodiments will be shown in the drawings and described in detail in the description. However, it should be understood that this is not to limit the scope of the specific embodiments and all modifications, equivalents, and/or alternatives included in the disclosed spirit and technical scope are included. In describing the disclosure, a detailed description of the related art is omitted when it is determined that the detailed description may unnecessarily obscure a gist of the disclosure.

The terms "first," "second," or the like may use corresponding components regardless of importance or order and are used to distinguish one component from another without limiting the components.

Unless otherwise defined specifically, a singular expression may encompass a plural expression. It is to be understood that the terms such as "comprise" or "consist of" are used herein to designate a presence of characteristic, number, step, operation, element, part, or a combination thereof, and not to preclude a presence or a possibility of adding one or more of other characteristics, numbers, steps, operations, elements, parts or a combination thereof.

A term such as "module" or a "unit" in the disclosure may perform at least one function or operation, and may be implemented as hardware, software, or a combination of hardware and software. Further, except for when each of a plurality of "modules", "units", and the like needs to be realized in an individual hardware, the components may be integrated in at least one module and be implemented in at least one processor.

Hereinafter, with reference to the accompanying drawings, embodiments of the disclosure will be described in detail so that those skilled in the art can easily perform and use the embodiments in the technical field of the disclosure. But, the disclosure may be implemented in various different forms and is not limited to the embodiments described herein. In addition, in the drawings, the parts not relating to the description are omitted for clearly describing the disclosure, and the same reference numerals are used for the same parts throughout the specification.

FIG. 1 is a block diagram illustrating a configuration of a display apparatus according to an embodiment.

Referring to FIG. 1, a display apparatus 100 according to an embodiment of the disclosure may include a power supply 110, a connection interface 120, and a processor 130.

The display apparatus 100 may refer to a display apparatus having an image processing function and/or display function such as a television, a computer monitor, a smartphone, a tablet PC, notebook PC, a head mounted display (HMD), a near eye display (NED), a large format display (LFD), a digital signage, a digital information display (DID), a video wall, a projector display, a camera, a camcorder, a printer, and the like. However, embodiments are not limited thereto, and the display apparatus 100 may refer to various types of display apparatuses.

The display apparatus 100 according to an embodiment may include a main body and a space formed in the main body for receiving a speaker or a wireless power transmitter. The main body may form an exterior of the display apparatus 100. Various elements, loads, and the like for driving the display apparatus 100, in addition to the power supply 110 and the processor 130 may be provided in the main body. The formation of a space for attaching the speaker or the wireless power transmitter in the main body is an embodiment and embodiments are not limited thereto. For example, the speaker or the wireless power transmitter may be attached to a space in a slot shape provided on a lower end of the display apparatus 100. Additional details will be described below.

The power supply 110 according to an embodiment may supply power to various elements, loads, and the like in the display apparatus 100. The power supply 110 may be hardware which converts an alternating current into a direct current to stably supply the current to internal loads of the display apparatus 100. The power supply 110 may include an AC-DC rectifier, an AC-DC switching converter, an output filter, and an output unit. The power supply 110 may control a ratio of on-off periods of time of a switching element to supply the stabilized output power to loads. The power supply 110 according to an embodiment may also include an electromagnetic interference (EMI) filter unit or the like. For example, the EMI filter unit may remove electric noise of a commonly used power.

The power supply 110 according to an embodiment may be implemented as a switched mode power supply (SMPS) including a power factor correction circuit, that is, a PFC circuit, in order to satisfy various regulations.

Particularly, the power supply 110 according to an embodiment may supply power to a device connected to the display apparatus 100. For example, if a speaker is connected to the display apparatus 100, the processor 130 may provide power supplied from the power supply 110 to the speaker. In another example, if a wireless power transmitter is connected to the display apparatus 100, the processor 130 may provide power supplied from the power supply 110 to the wireless power transmitter.

The speaker may serve a function of outputting a sound signal. The speaker may be an element which outputs various alerts or voice messages in addition to various sound signals, audio data, and the like processed by the processor 130. The speaker according to an embodiment may include at least one speaker (or audio amplifier).

The speaker according to an embodiment may be an element detachable from a space provided in the main body of the display apparatus 100. In an example, the speaker may be detachable from and attachable to the display apparatus 100. The attachment herein may refer to a state where the speaker is connected to (or combined with) the display apparatus 100 via the connection interface 120. The connection between the speaker and the display apparatus may be an electrical connection. Additionally, the connection between the speaker and the display apparatus may further include a physical connection and an electrical connection. If the speaker is attached to the display apparatus 100, the speaker may receive power from the power supply 110, receive a sound signal from the processor 130, and output the received sound signal (i.e., vibrate according to the received sound signal).

The detachment may refer to a state where the speaker is disconnected (uncombined) from the display apparatus 100. If the speaker is detached from the display apparatus 100, the speaker may be an element independent from the display apparatus 100. For example, the speaker may be physically separated from the display apparatus 100. In an example, the speaker detached from the display apparatus 100 may receive power through a separate power supply and receive a sound signal via a communication interface provided in the speaker, for example, a wireless communication interface such as Bluetooth or Wi-Fi. For example, the sound signal received via the communication interface may be provided by the display apparatus 100.

The connection interface 120 may include a terminal which may transmit power or various types of contents, for example, a sound signal to a connected device or receive it from a connected device. In an example, the connection interface 120 may include a power supply terminal and provide power to the speaker or the wireless power transmitter connected to the connection interface 120. In addition, the connection interface 120 may transmit the sound signal to the speaker.

The processor 130 may control general operations of the display apparatus 100.

According to an embodiment, the processor 130 may be implemented as a digital signal processor (DSP), a microprocessor, an artificial intelligence (AI) processor, or a timing controller (T-CON) processing digital image signals. However, embodiments are not limited thereto, and the processor 130 may include one or more of a central processing unit (CPU), a microcontroller unit (MCU), a microprocessing unit (MPU), a controller, an application processor (AP), or a communication processor (CP), and an ARM processor or may be defined as the corresponding term. In addition, the processor 130 may be implemented as System on Chip (SoC) or large scale integration (LSI) including the processing algorithm or may be implemented in a form of a Field Programmable gate array (FPGA). The processor 130 may perform various functions by executing computer executable instructions stored in a memory.

The processor 130 according to an embodiment may identify a device connected to the connection interface 120. In an example, if the device connected to the connection interface 120 is identified as a speaker, the processor 130 may provide power supplied from the power supply and the sound signal to the speaker via the connection interface 120.

In another example, if the device connected to the connection interface 120 is identified as a wireless power transmitter, the processor 130 may provide power supplied from the power supply 110 to the wireless power transmitter via the connection interface. A specific method for the processor 130 to identify the device connected to the connection interface 120 will be described with reference to FIG. 7.

In still another example, if the speaker connected to the connection interface 120 is detached therefrom and the wireless power transmitter is identified as being connected (or attached) thereto, the processor 130 according to an embodiment may provide the power for driving the speaker supplied from the power supply 110 to the wireless power transmitter. This will be described in detail with reference to FIG. 2.

Figure 2:
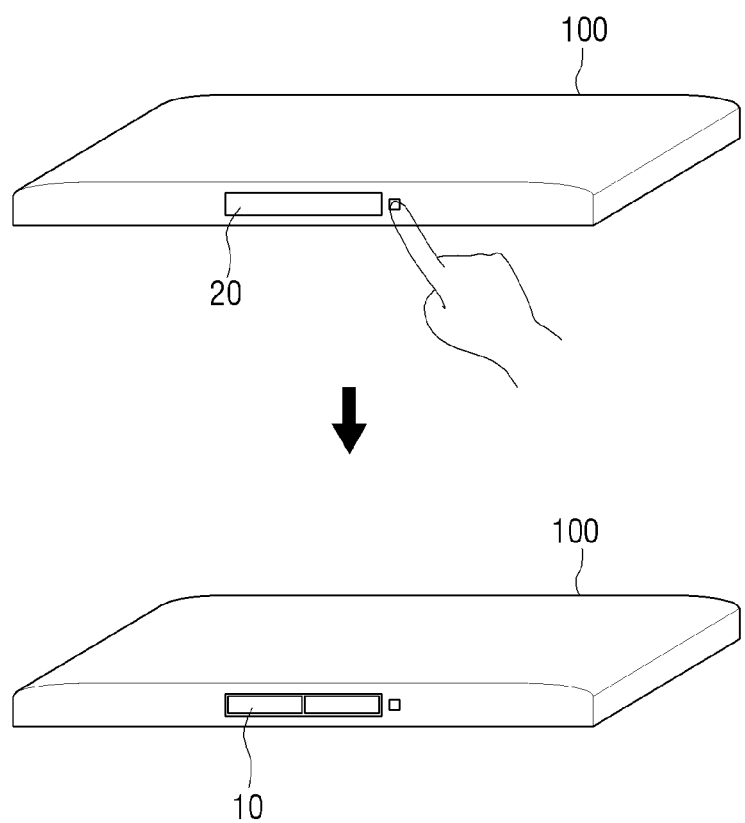
FIG. 2 is a view for explaining a speaker and a wireless power transmitter according to an embodiment.

FIG. 2 is a view for explaining a speaker and a wireless power transmitter according to an embodiment.

Referring to FIG. 2, the display apparatus 100 according to an embodiment may include a space in the main body of the display apparatus 100. This space may have a shape opened to a lower portion of the display apparatus 100. In an example, the display apparatus 100 may include a main body opened to an area of a lower surface, and a space formed in the main body to attach a wireless power transmitter 10 or a speaker 20. The main body may include an inner case forming a space for attaching the wireless power transmitter 10 or the speaker 20 and an outer case combined with the inner case.

The display apparatus 100 according to an embodiment may include a connection interface 120 connectable to the wireless power transmitter 10 or the speaker 20. For example, the connection interface 120 may be provided in the space provided in the main body, and if the wireless power transmitter 10 or the speaker 20 is connected to the connection interface 120 via the space, the processor 130 may identify whether the connected device is the wireless power transmitter 10 or the speaker 20. A shape, a size, and a position of the space illustrated in FIG. 2 are an example and embodiments are not limited thereto.

The display apparatus 100 according to an embodiment may identify the speaker 20 connected to the connection interface 120 via the space. According to an embodiment, a size of the speaker 20 corresponds to a size of the space, and the speaker 20 may receive the power from the power supply 110 and receive the sound signal from the processor 130, as the speaker 20 is attached to the display apparatus 100 via the connection interface 120 provided in an area of the space. The processor 130 may control the display apparatus 100 to provide the power and the sound signal to speaker 20 via the connection interface 120.

According to an embodiment, a button may be provided on the main body of the display apparatus 100. In addition, the display apparatus 100 according to an embodiment may include a driver for detaching the device (speaker 20 or wireless power transmitter 10) attached to the space in accordance with manipulation of the button in an area of the space. In an example, if the button is pressed, the driver may cause the device attached in the space to slide towards outside of the main body. As the driver may cause the device to slide towards outside of the main body of the display apparatus 100, the device may be detached from the display apparatus 100. In other words, according to an embodiment, if the button is pressed, the driver may disconnect the device connected to the connection interface 120 from the connection interface 120. This is an example, and, in addition to the pressing the button, if the display apparatus 100 receives a detachment and removal command, the display apparatus 100 may control the driver to cause the device to slide towards outside of the main body based on the corresponding instruction.

Referring to FIG. 2, the driver according to an embodiment may cause the speaker 20 to slide towards outside of the main body from the space in accordance with the pressing of the button. If the device connected to the connection interface 120 is identified as the wireless power transmitter 10, the processor 130 may provide power for driving the speaker 20 supplied from the power supply 110 to the wireless power transmitter 10.

According to an embodiment, a power line of the power supply 110 may be connected to a power outlet providing a commercial power source (e.g., 90 to 264 V). According to an embodiment, the power supply 110 may include an EMI filter and a PFC circuit. The EMI filter may block noise of the input commercial power source.

The power factor correction (PFC) circuit may reduce a phase difference between AC voltage and current input via the EMI filter. Accordingly, it is possible to increase power efficiency by offsetting reactive power. The PFC circuit may smooth the AC voltage to output as a DC voltage at a constant level.

The wireless power transmitter 10 according to an embodiment may include inverters and resonators. The inverter may convert the DC current output by power factor correction from the PFC circuit into the AC current again so as to be used by the resonator. Accordingly, the resonator may transmit electromagnetic energy to a wireless power receiver. In other words, the wireless power transmitter 10 may transmit the power supplied from the power supply 110 to the wireless power receiver using the resonator. This will be described in detail with reference to FIG. 3.

Figure 3:
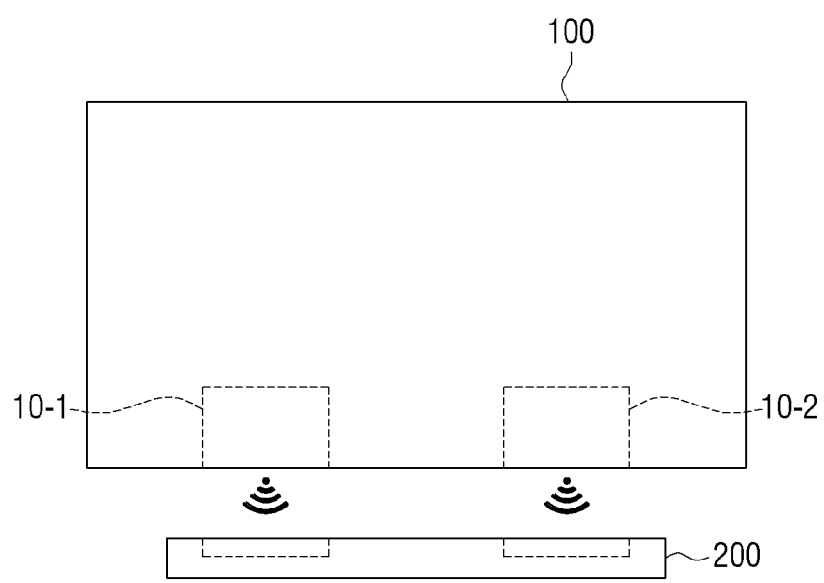
FIG. 3 is a view for explaining a wireless power transmitter and a wireless power receiver according to an embodiment.

FIG. 3 is a view for explaining a wireless power transmitter and a wireless power receiver according to an embodiment.

Referring to FIG. 3, the display apparatus 100 according to an embodiment may include a plurality of spaces in the main body. For example, the display apparatus 100 may include first and second spaces.

According to an embodiment, the display apparatus 100 may include a first connection interface and a second connection interface in the first and second spaces, respectively. In addition, if first and second wireless power transmitters 10-1 and 10-2 are identified as being connected to the first and second connection interfaces, respectively, the display apparatus 100 may provide a first power to the first wireless power transmitter 10-2 and a second power to the second wireless power transmitter 10-2.

For example, the display apparatus 100 may include a first speaker connected to the first connection interface via the first space and a second speaker connected to the second connection interface via the second space. If the first speaker and the second speaker are detached and the first wireless power transmitter 10-1 is identified as being connected to the first connection interface, the processor 130 may identify that the second wireless power transmitter 10-2 is connected to the second connection interface.

If the first and second wireless power transmitters 10-1 and 10-2 are identified, the processor 130 may provide the first power for driving the first speaker to the first wireless power transmitter 10-1 via the first connection interface and provide the second power for driving the second speaker to the second wireless power transmitter 10-2 via the second connection interface.

When the power supply 110 supplies the power to the wireless power transmitter 10, a voltage may applied to or a current flows to the resonator of the wireless power transmitter 10, thereby generating induced electromotive force. The induced electromotive force may have a unit of voltage. The resonator may be referred to as an inductor, a transmitter-receiver coil, or the like, but will be collectively referred to as the resonator, for convenience of description.

A resonator provided in the wireless power receiver may receive electromagnetic energy from the resonator of the wireless power transmitter 10. In an example, the resonator of the wireless power receiver may receive the power via magnetic coupling with the resonator of the wireless power transmitter 10. A rectifier provided in the wireless power receiver may rectify the power received via the resonator. In an example, the rectifier may rectify the AC current received via the resonator to generate the DC current. In addition, the rectifier may rectify and smooth the AC voltage received via the resonator again to convert it into the DC voltage. The wireless power receiver according to an embodiment may provide the rectified current and voltage to the internal loads.

According to an embodiment, the wireless power receiver may be provided in an external speaker apparatus 200. For example, the external speaker apparatus 200 may be an apparatus which receives a sound signal from the display apparatus 100 and outputs the received sound signal. For example, the external speaker apparatus 200 may include a sound bar. The sound bar may refer to an external speaker apparatus implemented in a shape of a long rod, and the sound bar may include any one or any combination of a tweeter (speaker for high-frequency sounds), mid-range speaker (speaker for middle-frequency sounds) woofer (speaker for low-frequency sounds) or sub-woofer (speaker for extremely low-frequency sounds) in one apparatus. The sound bar may extend in a horizontal direction. The external speaker apparatus 200 including the wireless power receiver may be disposed in short distance (e.g., within 10 cm) from the display apparatus 100 to receive wireless power from the display apparatus 100. The external speaker apparatus 200 may receive the power from the display apparatus 100 in wireless manner and receive the sound signal via wireless communication, and therefore, there is no need for wired connection between the display apparatus 100 and the external speaker apparatus 200.

The external speaker apparatus 200 according to an embodiment may include the wireless power receive at a production stage, but embodiments are not limited thereto. In an example, the wireless power receiver may be attached to or detached from the external speaker apparatus 200 using a space provided in the main body. In other words, the external speaker apparatus 200 may not include the wireless power receiver and may receive the power supplied from the wireless power transmitter, when the wireless power receiver is attached to the space provided in the main body.

Regarding the display apparatus 100 of the related art, the speaker 20 is disposed to face a lower surface of the display apparatus 100 and the speaker 20 outputs the sound signal towards a lower portion of the display apparatus 100. However, an output unit of the external speaker apparatus 200 may be disposed towards a front surface and output the sound signal towards the front surface of the display apparatus 100, thereby providing an effect such as improvement of sound quality to a user.

Hereinafter, the resonator included in the wireless power transmitter 10 will be described in detail.

Figure 4A:
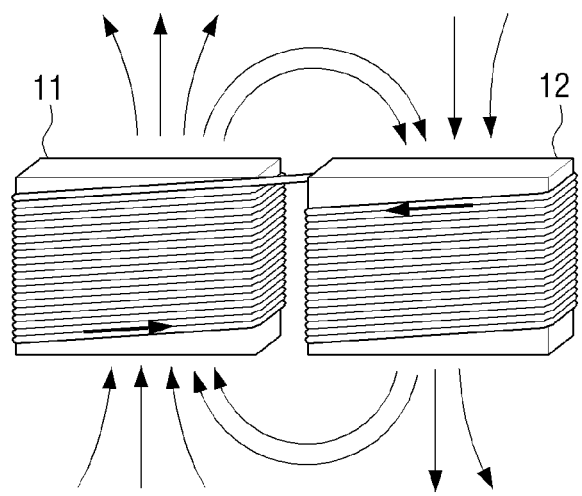
FIG. 4A is a view for explaining inductors according to an embodiment.

FIG. 4A is a view for explaining inductors according to an embodiment.

Referring to FIG. 4A, the resonator according to an embodiment may include first and second helical inductors 11 and 12. Each helical inductor may include a coil wound vertically in one direction.

A coil of the first inductor 11 may be wound from a lower side to an upper side in a first direction to be connected to the upper side of the second inductor 12. A coil of the second inductor 12 may be wound from the upper side to the lower side in a second direction.

Referring to FIG. 4A, arrows illustrated in the coils indicate directions in which currents flow. The coil of the first inductor 11 may be wound in the first direction (e.g., counterclockwise) and the current may therefore flow in the first direction (e.g., counterclockwise). The coil of the second inductor 12 may be wound in the second direction (e.g., clockwise) and the current may therefore flow in the second direction (e.g., clockwise). In other words, the direction of the current flowing to the first inductor 11 included in the resonator may be different from the direction of the current flowing to the second inductor 12. The winding of the coil is an example and embodiments are not limited thereto. For example, the coil of the first inductor 11 may be wound in the second direction and the coil of the second inductor 12 may be wound in the first direction. Specifically, the coil of the first inductor 11 may be wound from the upper side to the lower side clockwise and connected to the lower side of the second inductor 12, and the coil of the second inductor 12 may be wound from the lower side to the upper side counterclockwise.

According to an embodiment, in a top view of the resonator, the coil may be illustrated in a figure-eight shape to be connected from the first inductor 11 to the second inductor 12.

Figure 4B:
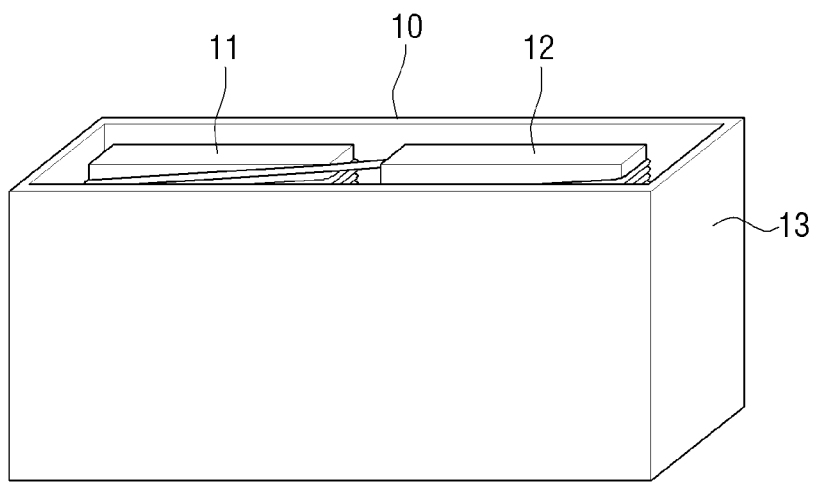
FIG. 4B is a view for explaining a resonator according to an embodiment.

FIG. 4B is a view for explaining a resonator according to an embodiment.

Referring to FIG. 4B, the resonator may have a structure in which a remaining area, except for an exposed area, is surrounded by a magnetic body 13. In an example, the resonator may include an external wall spaced apart from the coil by a predetermined distance. The magnetic body 13 herein may refer to an oxide magnetic body based on iron oxide ($Fe_2O_3$) such as a ferrite having magnetic properties.

The magnetic body 13 surrounding the remaining area except for the exposed area of the resonator according to an embodiment may block leakage magnetic field to minimize and/or reduce EMI problem.

The resonator according to an embodiment may be attached to the display apparatus 100 so that the area surrounded by the magnetic body is positioned in the space and the exposed area not surrounded by the magnetic body is exposed to the outside. This will be described in detail with reference to FIG. 5.

Figure 5:
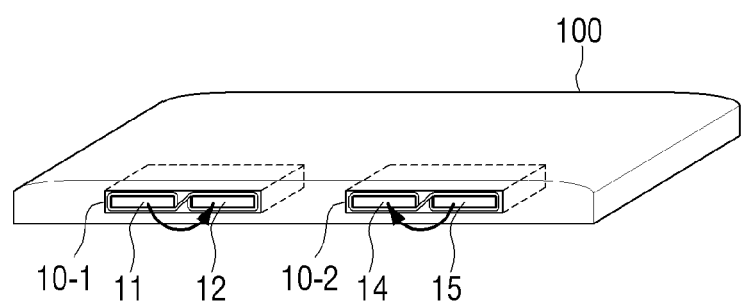
FIG. 5 is a view for explaining a magnetic flux direction according to an embodiment.

FIG. 5 is a view for explaining a magnetic flux direction according to an embodiment.

Referring to FIG. 5, the wireless power transmitters 10-1 and 10-2 may each be disposed in a space so that the area surrounded by the magnetic body is positioned in the space and the exposed area is exposed outside. The exposed area may face the wireless power receiver. Because the exposed area is exposed to the outside, the induced electromotive force may be provided to the wireless power receiver from the wireless power transmitters 10-1 and 10-2.

The display apparatus 100 according to an embodiment may include multiple spaces and may provide the power to multiple wireless power transmitters 10, if the wireless power transmitters 10 are identified as being attached to the space.

However, embodiments are not limited thereto. In another embodiment, for example as illustrated in FIG. 2, the display apparatus 100 may include a single space. A single wireless power transmitter 10 may be connected to the display apparatus 100 via the single space.

Referring back to FIG. 5, a direction of a magnetic flux generated by the resonator of the first wireless power transmitter 10-1 may be different from a direction of a magnetic flux generated by the resonator of the second wireless power transmitter 10-2.

According to an embodiment, a first resonator included in the first wireless power transmitter 10-1 may include the first and second helical inductors 11 and 12. The coil of the first inductor 11 may be wound from the lower side to the upper side in the first direction (e.g., counterclockwise) to be connected to the upper side of the second inductor 12, and the coil of the second inductor 12 may be wound from the upper side to the lower side in the second direction (e.g., clockwise). The magnetic flux generated by the first resonator may move from the upper side of the first inductor 11 to the upper side of the second inductor 12, and the magnetic flux direction may be clockwise direction, because the first inductor 11 is disposed on the left and the second inductor 12 is disposed on the right.

A second resonator included in the second wireless power transmitter may include third and fourth helical inductors 14 and 15. A coil of the third inductor 14 may be wound from the lower side to the upper side in the second direction (e.g., clockwise) to be connected to the upper side of the fourth inductor 15, and the coil of the fourth inductor 15 may be wound from the upper side to the lower side in the first direction (e.g., counterclockwise). The magnetic flux generated by the second resonator may move from the upper side of the fourth inductor 15 to the upper side of the third inductor 14, and the magnetic flux direction may be counterclockwise direction, because the third inductor 14 is disposed on the left and the fourth inductor 15 is disposed on the right.

The leakage magnetic field may be offset, because the magnetic flux direction generated by the first wireless power transmitter 10-1 is different from the magnetic flux direction generated by the second wireless power transmitter 10-2. In other words, the leakage magnetic field other than the magnetic field coupled with the first wireless power transmitter 10-1 and a first wireless power receiver may have a phase difference of 180 degrees with the leakage magnetic field other than the magnetic field coupled with the second wireless power transmitter 10-2 and a second wireless power receiver and these may be offset.

The shape, the direction, and the like of the coil wound around the first to fourth inductors 11, 12, 14, and 15 included in the first resonator and the second resonator according to various embodiments may be variously modified, as long as the direction of the magnetic flux generated by the first resonator is different from the direction of the magnetic flux generated by the second resonator so that the leakage magnetic fields are offset.

Hereinafter, a method for controlling driving of the first and second wireless power transmitters 10-1 and 10-2 so that the induced electromotive forces generated by the first and second wireless power transmitters 10-1 and 10-2 have a phase difference of 180 degrees will be described.

Figure 6:
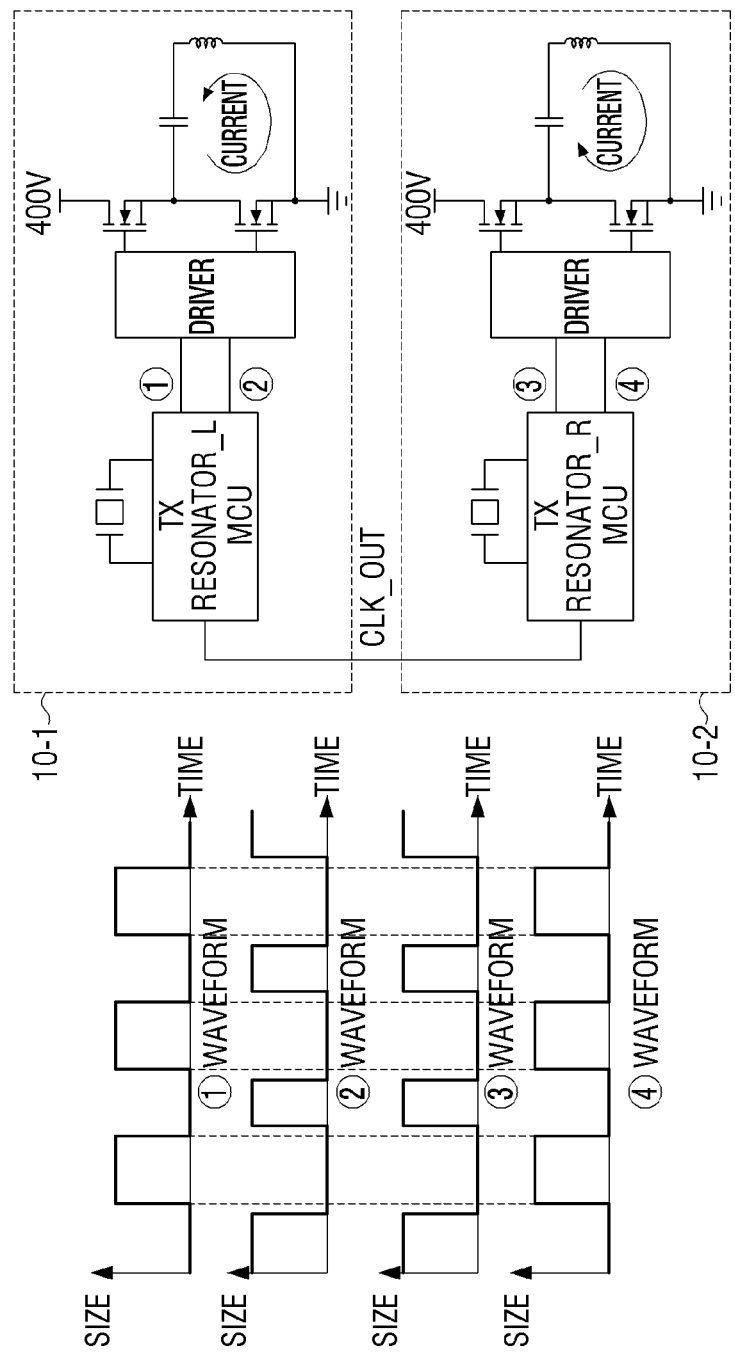
FIG. 6 is a view for explaining driving of first and second wireless power transmitters according to an embodiment.

FIG. 6 is a view for explaining driving of the first and second wireless power transmitters according to an embodiment.

Referring to FIG. 6, the first wireless power transmitter 10-1 may transmit information regarding driving timing to the second wireless power transmitter 10-2.

The second wireless power transmitter 10-2 may be driven based on the information regarding the driving timing.

In an example, the display apparatus 100 may identify the first wireless power transmitter 10-1 connected via the first connection interface provided in the first space. In addition, the display apparatus 100 may identify the second wireless power transmitter 10-2 connected via the second connection interface provided in the second space.

The first wireless power transmitter 10-1 may transmit the information regarding the driving timing to the second wireless power transmitter 10-2. The first and second wireless power transmitters 10-1 and 10-2 may operate based on the information so that the induced electromotive force generated by the first wireless power transmitter 10-1 has a phase difference of 180 degrees with the induced electromotive force generated by the second wireless power transmitter 10-2. The driving timing herein may refer to a driving clock.

In an example, the first wireless power transmitter 10-1 may be driven based on a driving clock CLK and the first wireless power transmitter 10-1 may transmit information regarding the driving clock to the second wireless power transmitter 10-2. In an example, the first wireless power transmitter 10-1 and the second wireless power transmitter 10-2 may be connected to each other via CLK OUT pin, and the first wireless power transmitter 10-1 may transmit the information regarding the driving clock to the second wireless power transmitter 10-2 via the CLK OUT pin. The second wireless power transmitter 10-2 may receive the information regarding the driving clock from the first wireless power transmitter 10-1 via the CLK OUT pin.

According to an embodiment, each of the first and second wireless power transmitters 10-1 and 10-2 may be driven at the same time based on the driving clock CLK, and induced electromotive forces generated by each of the first and second wireless power transmitters 10-1 and 10-2 may have a phase difference of 180 degrees, because the direction of the current flowing to the resonator of the first wireless power transmitter 10-1 is different from the direction of the current flowing to the second wireless power transmitter 10-2. The leakage magnetic fields from the induced electromotive forces not coupled with the wireless power receivers may be offset.

According to an embodiment, the first wireless power transmitter 10-1 may be connected to the display apparatus 100 via the first space where a first speaker 20-1, which may be a left channel (L-channel) speaker, was positioned, after detaching the L-channel speaker which was connected to the display apparatus 100 in advance, and the second wireless power transmitter 10-2 may be connected to the display apparatus 100 via the second space where a second speaker 20-2, which may be a right channel (R-channel) speaker, was positioned, after detaching the R-channel speaker which was connected in advance. However, this is an example and embodiments are not limited thereto.

For example, if the first wireless power transmitter 10-1 is identified as being connected in the first space, the display apparatus 100 may provide the power supplied via the power supply 110 to the wireless power transmitter 10 regardless of whether the second wireless power transmitter 10-2 or the second speaker 20-20 is connected in the second space.

Figure 7:
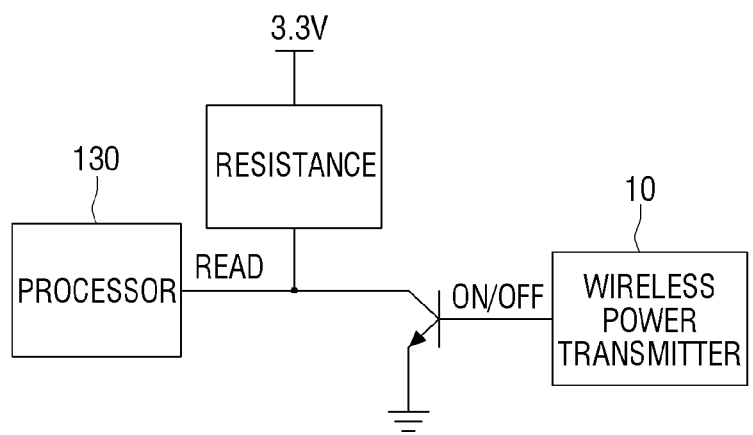
FIG. 7 is a view for explaining a method for identifying the wireless power transmitter according to an embodiment.

FIG. 7 is a view for explaining a method for identifying a wireless power transmitter according to an embodiment.

Referring to FIG. 7, the processor 130 according to an embodiment may receive a signal according to the attachment of the wireless power transmitter 10.

In an example, the processor 130 may detect a predetermined specific voltage in a state where the speaker 20 is attached or the wireless power transmitter 10 is not attached to the space provided in the main body. In an example, the processor 130 may detect a voltage of 3.3 V applied to a resistance. In this case, the processor 130 may identify that the device connected to the connection interface 120 is the speaker 20 (or identify that the wireless power transmitter 10 is not attached), and provide the sound signal and the power to the speaker 20.

In another example, if a voltage at a level different from the predetermined specific voltage is detected as the wireless power transmitter 10 is connected to the display apparatus 100 via the connection interface 120, the processor 130 may identify that the device connected to the connection interface 120 is the wireless power transmitter 10. In an example, if the wireless power transmitter 10 is connected to the display apparatus 100 via the connection interface 120, the processor 130 may receive a signal according to the attachment of the wireless power transmitter 10. For example, if the power is supplied from the power supply 110 as the wireless power transmitter 10 is attached to the display apparatus 100, the wireless power transmitter 10 may control a voltage to be output at a level lower than the predetermined specific voltage using a circuit included therein. In an example, the wireless power transmitter 10 may control output a voltage of 0 V and, and the processor 130 may identify that the wireless power transmitter 10 is attached to the space, if the level of the detected voltage is changed from 3.3 V to 0 V.

According to an embodiment, when the signal according to the attachment of the wireless power transmitter 10 is received, the processor 130 may control a communication interface to transmit the sound signal to the external speaker apparatus 200. For example, the processor 130 may control the communication interface to automatically perform pairing with the external speaker apparatus 200, and control the communication interface to transmit the sound signal to the external speaker apparatus 200.

The external speaker apparatus 200 may be an apparatus including the wireless power receiver, but is not limited thereto. For example, the external speaker apparatus 200 may be an apparatus positioned at a position spaced apart from the wireless power receiver by a predetermined distance to be independent from the wireless power receiver.

Figure 8:
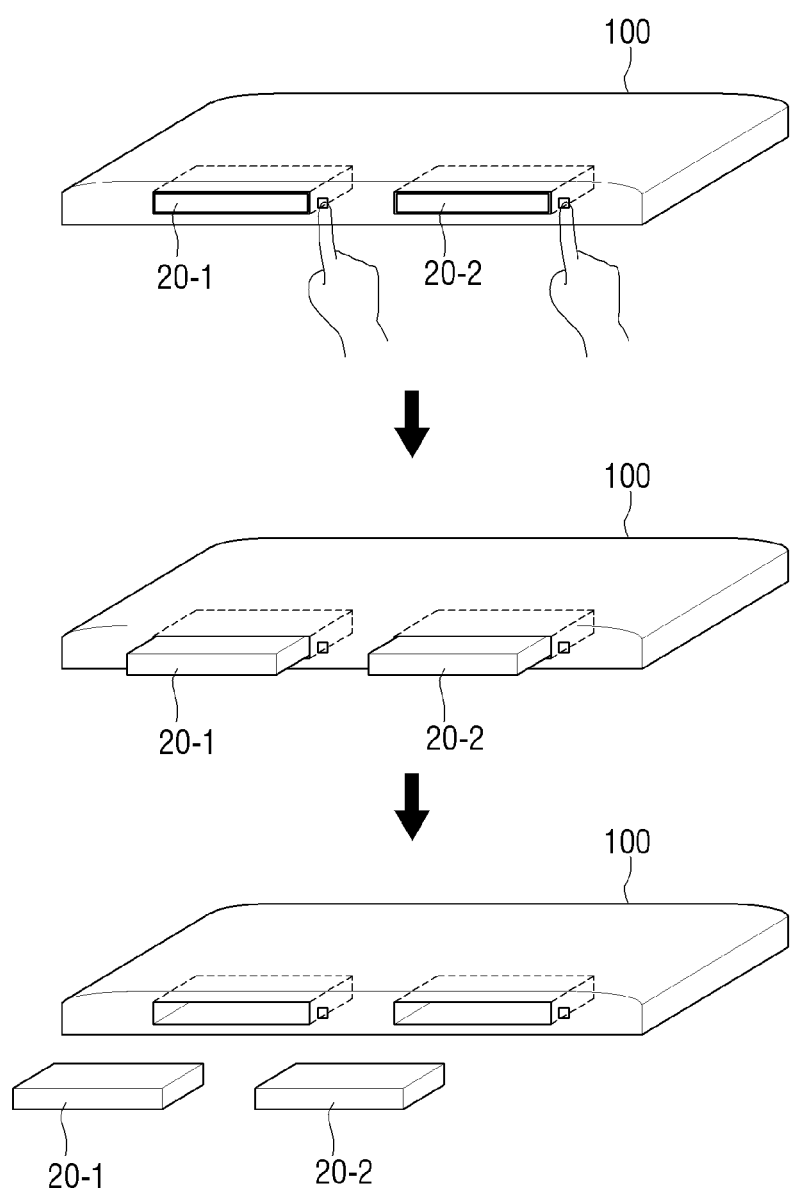
FIG. 8 is a view for explaining detachment of the speaker according to an embodiment.

FIG. 8 is a view for explaining detachment of the speaker according to an embodiment.

Referring to FIG. 8, the display apparatus 100 according to an embodiment may include buttons in an area of the main body. In addition, the display apparatus 100 may include drivers which detach devices attached to the spaces in accordance with the manipulation of the buttons. Each driver may be positioned in the space and may not be visible from the outside of the display apparatus 100. For example, the driver may include one or more rods that extend when activated. For example, one rod may release an element that secures a device in the space. For example, another rod may push the device out of the space. For example, the device may be ejected from the space based on depression of the button.

According to an embodiment, if a button is pressed, a corresponding driver may cause a speaker 20 attached to the space to slide towards outside of the main body.

Referring to FIG. 8, the display apparatus 100 may include a first speaker 20-1 (e.g., L-channel speaker) and a second speaker 20-2 (e.g., R-channel speaker). The display apparatus 100 according to an embodiment may include first and second buttons in an area of the main body. The first button is a button for controlling a first driver for detaching the device attached to the first space and the second button is a button for controlling a second driver for detaching the device attached to the second space. If the first button is pressed, the display apparatus 100 may cause the first speaker 20-1 attached to the first space to slide towards outside of the main body from the space. In addition, if the second button is pressed, the display apparatus 100 may cause the second speaker 20-2 attached to the second space to slide towards outside of the main body from the space. However, embodiments are not limited thereto. The display apparatus 100 may include one button on the main body. If the one button is pressed, the display apparatus 100 may cause all of the devices attached to a plurality of spaces towards outside of the main body.

In the disclosure, for convenience of description, some embodiments are described in which one space is provided in the main body of the display apparatus 100 and other embodiments are described in which the first and second spaces are provided in the main body. However, embodiments are not limited thereto.

For example, the display apparatus 100 may include first to fourth spaces in the main body, and first to fourth speakers outputting sounds at different pitches may be attached to the first to fourth spaces, respectively. If the button provided in the main body is pressed, the display apparatus 100 may cause the first to fourth speakers to slide towards outside to detach the speakers from the display apparatus 100. Alternatively, first to fourth buttons, which respectively correspond to the first to fourth spaces, may be provided, and depression of one of the first to fourth buttons may cause a corresponding speaker to slide out to detach the speakers from the display apparatus 100.

Figure 9:
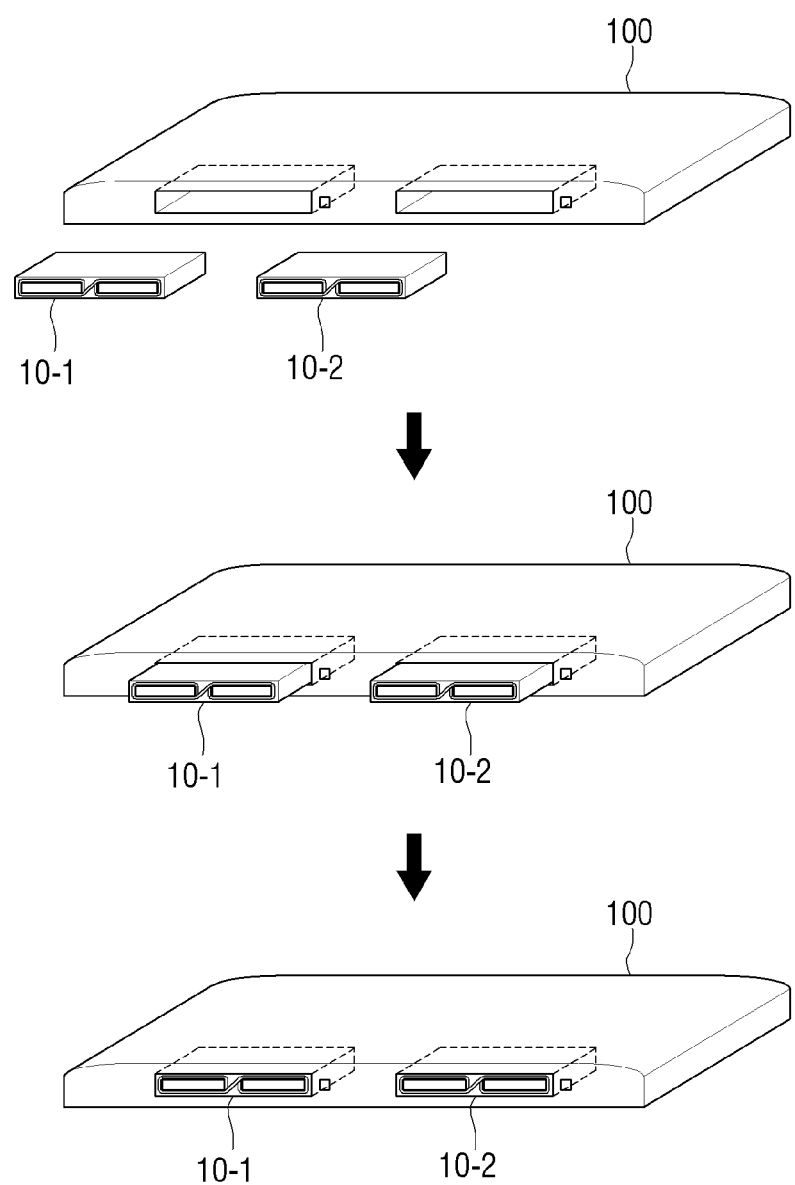
FIG. 9 is a view for explaining attachment of the wireless power transmitter according to an embodiment.

FIG. 9 is a view for explaining attachment of the wireless power transmitter according to an embodiment.

Referring to FIG. 9, the first and second wireless power transmitters 10-1 and 10-2 may be attached to the first and second spaces provided in the main body of the display apparatus 100, respectively. For example, as one of the first and second wireless power transmitter 10-1 and 10-2 slides into the space, the wireless power transmitter 10 may be communicatively connected with the connection interface 120 provided in the space. When the wireless power transmitter 10 is attached to the display apparatus 100 (or when the wireless power transmitter 10 is connected to the connection interface 120), the wireless power transmitter 10 may receive the power via the connection interface 120.

The connection interface may be an interface compatible with the wireless power transmitter 10 and the speaker 20. In an example, when the speaker 20 is connected to the connection interface 120, the processor 130 may provide the sound signal and the power via the connection interface 120. In another example, when the wireless power transmitter 10 is connected to the connection interface 120, the processor 130 may provide the power via the connection interface 120.

As described above, the number of spaces is not limited in the embodiment according to the disclosure. For example, the display apparatus 100 may include the first to fourth spaces and the speaker 20 or the wireless power transmitter 10 may be attached to each of the first to fourth spaces.

Figure 10:
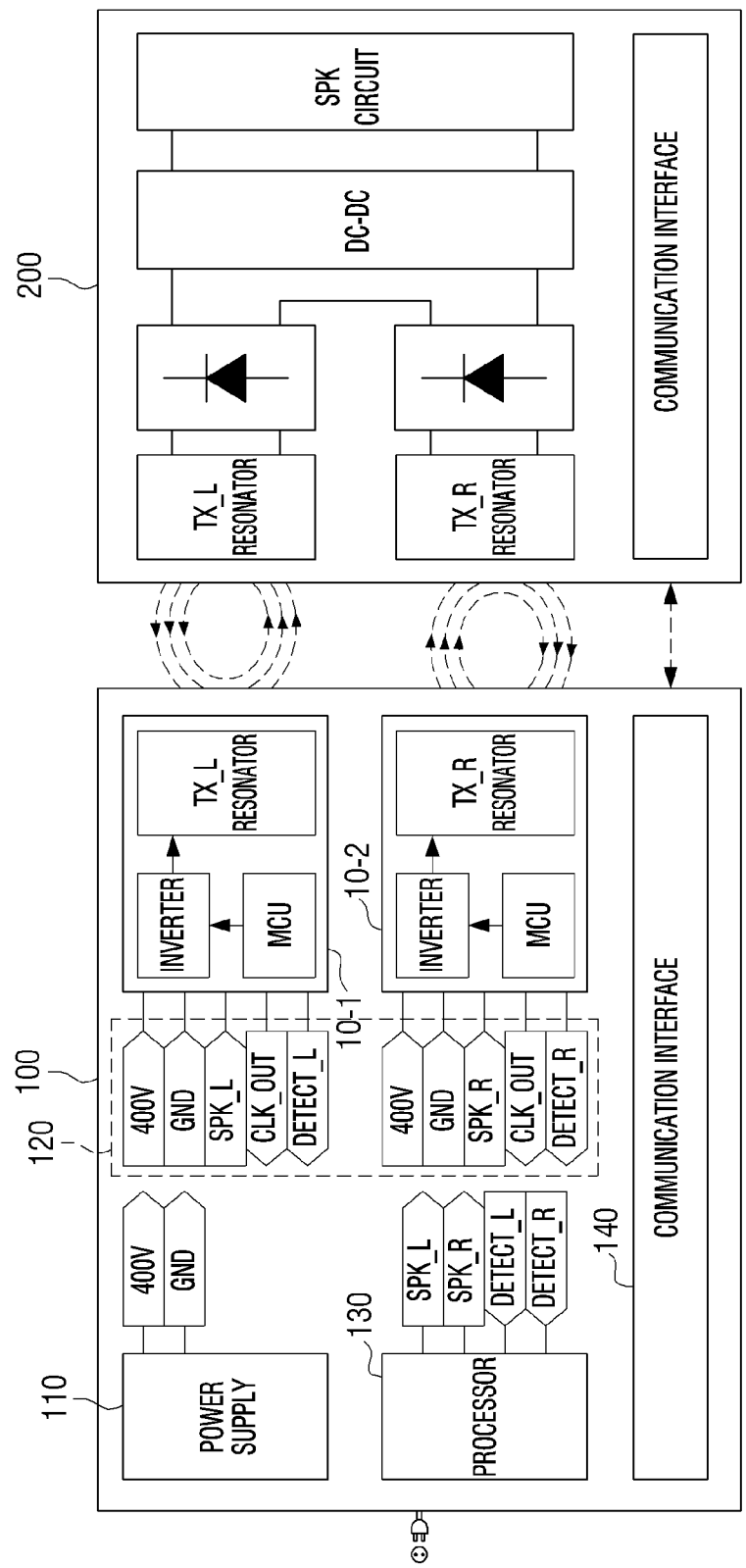
FIG. 10 is a view for specifically explaining the display apparatus according to an embodiment.

FIG. 10 is a view for specifically explaining the display apparatus according to an embodiment.

Referring to FIG. 10, the display apparatus 100 may include the power supply 110, the connection interface 120, the processor 130, and a communication interface 140. The specific description regarding elements illustrated in FIG. 10 overlapped with the elements illustrated in FIG. 1 will not be repeated.

FIG. 10 illustrates a case where the first wireless power transmitter 10-1 and the second wireless power transmitter 10-2 are attached to the first and second spaces provided in the main body, respectively.

The processor 130 according to an embodiment may receive a signal according to attachment of the first wireless power transmitter 10-1 to the first space via a DETECT_L pin. In addition, the processor 130 may receive a signal according to attachment of the second wireless power transmitter 10-2 to the second space via a DETECT_R pin. The DETECT_L pin, the DETECT_R pin, and the like are named for convenience of description and are not for limiting specific names.

The communication interface 140 may transmit or receive various types of contents, for example, a sound signal. For example, the communication interface 140 may receive an image signal from an external apparatus (e.g., source apparatus), an external storage medium (e.g., USB), an external server (e.g., web hard drive), or the like by a streaming or downloading method through communication methods such as AP-based Wi-Fi (Wi-Fi, Wireless LAN network), Bluetooth, Zigbee, wired/wireless Local Area Network (LAN), WAN, Ethernet, LTE, 5th-generation (5G), IEEE 1394, High Definition Multimedia Interface (HDMI), Mobile High-Definition Link (MHL), Universal Serial Bus (USB), Display Port (DP), Thunderbolt, Video Graphics Array (VGA) port, RGB port, D-subminiature (D-SUB), Digital Visual Interface (DVI), and the like. In particular, the 5G communication system uses a super high frequency (mmWave) range (e.g., millimeter wave frequency range of 26, 28, 38, 60 GHz) and the display apparatus 100 may receive or transmit 4K, 8K, and UHD images via the 5G communication system in a streaming environment.

If the device connected to the connection interface 120 is identified as the wireless power transmitter 10, the processor 130 according to an embodiment may control the communication interface 140 to transmit the sound signal to the external speaker apparatus 200. For example, when the speaker 20 is detached and the wireless power transmitter 10 is identified as being attached, the processor 130 may perform pairing with the external speaker apparatus 200 and transmit the sound signal being provided to the speaker 20, to the external speaker apparatus 200.

The display apparatus 100 according to an embodiment may include a display. The display may be implemented in various forms such as a liquid crystal display (LCD), an organic light-emitting diode (OLED), Light-Emitting Diode (LED), Micro LED, Quantum dot light-emitting diodes (QLED), Liquid Crystal on Silicon (LCoS), Digital Light Processing (DLP), quantum dot (QD) display panel, and the like.

According to an embodiment, when the display apparatus 100 is implemented as a display apparatus, the display apparatus may control the display to output a video signal and the external speaker apparatus 200 may output a sound signal received from the display apparatus.

Figure 11:
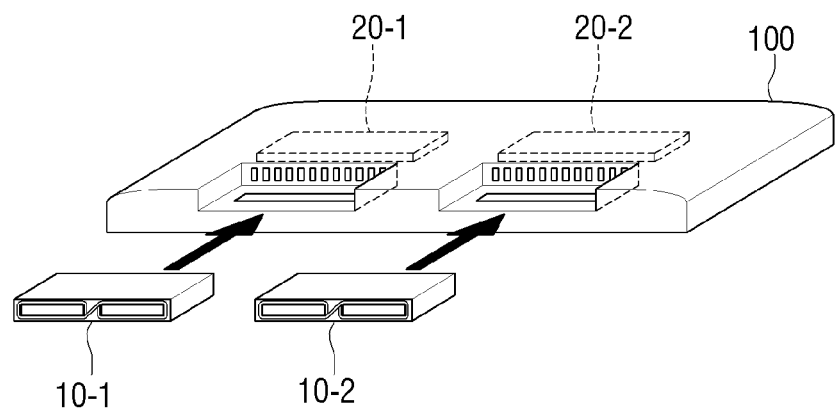
FIG. 11 is a view for explaining attachment of the wireless power transmitter according to another embodiment.

FIG. 11 is a view for explaining attachment of the wireless power transmitter according to another embodiment.

FIG. 11 illustrates an embodiment in which both the wireless power transmitter 10 and the speaker 20 may be connected to the display apparatus 100. For example, both the wireless power transmitter 10 and the speaker 20 may be connected to the display apparatus 100.

According to an embodiment, if both the wireless power transmitter 10 and the speaker 20 are connected to the connection interface 120, the processor 130 may inactivate the speaker 20. Referring to FIG. 11, the speaker 20 may be connected to the display apparatus 100 so that an exposed area thereof is exposed outside of the display apparatus 100. The display apparatus 100 according to an embodiment may include a groove in a slot shape on a lower end. One area in the groove may include the connection interface.

According to an embodiment, when the wireless power transmitter 10 is attached to the display apparatus 100 via the connection interface 120 provided in one area of the groove, the processor 130 may inactivate the speaker 20. The inactivation herein may refer to stop providing the sound signal and the power to the speaker 20.

When the wireless power transmitter 10 is identified as being connected, the processor 130 according to an embodiment may provide the power to the wireless power transmitter 10. For example, the processor 130 may provide the power supplied from the power supply 110 for driving the speaker 20, to the wireless power transmitter 10. In addition, the processor 130 may transmit the sound signal to the external speaker apparatus 200 via the communication interface 140.

According to an embodiment, when the wireless power transmitter 10 is attached to the display apparatus 100, the lower end of the speaker 20 may be blocked, and thereby not exposed to the outside, by the wireless power transmitter 10. Because the speaker 20 may not output the sound signal and the sound signal may be transmitted to the external speaker apparatus 200, the user may receive the sound signal output via the external speaker apparatus 200.

Figure 12:
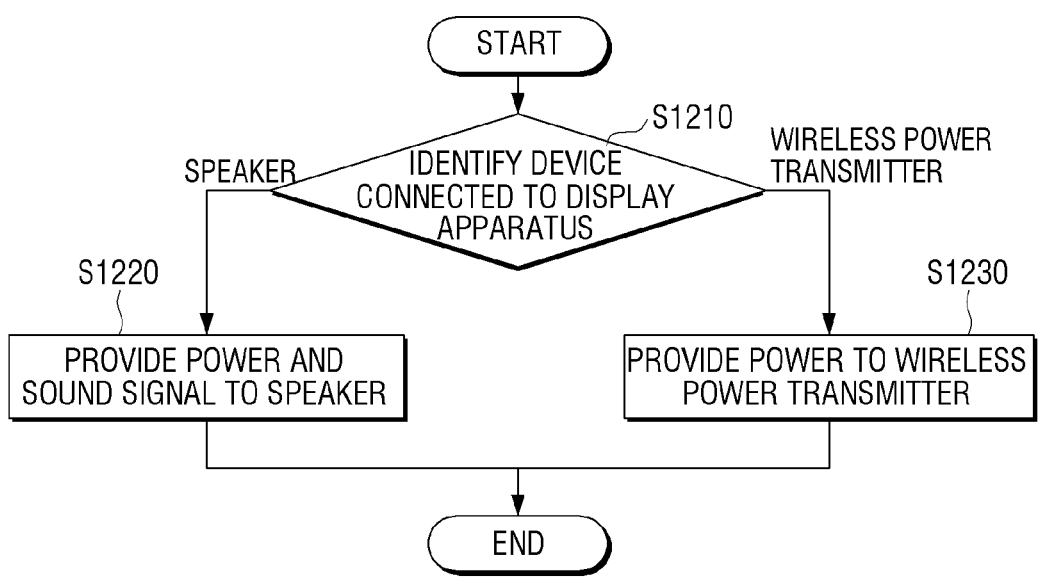
FIG. 12 is a flowchart for explaining a method for controlling the display apparatus according to an embodiment.

FIG. 12 is a flowchart for explaining a method for controlling the display apparatus according to an embodiment.

In a method for controlling a display apparatus according to an embodiment, a device connected to the display apparatus is identified (S1210) as either a speaker or a wireless power transmitter. When the connected device is identified as the speaker, a power and a sound signal are provided to the speaker (S1220). When the connected device is identified as the wireless power transmitter, the power is provided to the wireless power transmitter (S1230).

According to an embodiment, when the connected device is identified as the wireless power transmitter, the control method may further include performing pairing with an external speaker apparatus, and transmitting the sound signal to the external speaker apparatus.

The wireless power transmitter may include a resonator, and the control method may further include transmitting the power to a wireless power receiver using the resonator. The wireless power receiver may be provided in the external speaker apparatus.

The resonator according to an embodiment may include first and second helical inductors, a coil of the first inductor is wound from a lower side to an upper side in a first direction and connected to an upper side of the second inductor, and a coil of the second inductor is wound from the upper side to the lower side in a second direction.

The resonator may have a structure in which a remaining area, other than an exposed area, is surrounded by a magnetic body and may be attached to the display apparatus so that the exposed area is exposed outside of the display apparatus.

According to an embodiment, Operation S1230 of providing the power to the wireless power transmitter may include, based on the speaker connected to the display apparatus being detached and the device connected to the display apparatus being identified as the wireless power transmitter, providing a power for driving the speaker to the wireless power transmitter.

The control method may include, based on a signal according to attachment of the wireless power transmitter being received from the wireless power transmitter, transmitting the sound signal from the external speaker apparatus by performing pairing with an external speaker apparatus.

According to an embodiment, Operation S1210 of identifying the device connected to the display apparatus may include identifying whether each of first and second wireless power transmitters is connected to the display apparatus, and Operation S1230 of providing the power to the wireless power transmitter may include, based on the first wireless power transmitter being identified as being connected, providing a first power to the first wireless power transmitter, and based on the second wireless power transmitter being identified as being connected, providing a second power to the second wireless power transmitter.

The embodiments may also applied to various types of display apparatuses that include a power supply.

The embodiments described above may be implemented in a recording medium readable by a computer or a similar device using software, hardware, or a combination thereof. In some cases, the embodiments described in this specification may be implemented as a processor itself. According to the implementation in terms of software, the embodiments such as procedures and functions described in this specification may be implemented as separate software modules. Each of the software modules may execute one or more functions and operations described in this specification.

Computer instructions for executing processing operations of the display apparatus 100 according to the embodiments descried above may be stored in a non-transitory computer-readable medium. When the computer instructions stored in such a non-transitory computer-readable medium are executed by the processor of a specific machine, the computer instructions may enable the specific machine to execute the processing operations of the display apparatus 100 according to the embodiments described above.

The non-transitory computer-readable medium is not a medium storing data for a short period of time such as a register, a cache, or a memory, but refers to a medium that semi-permanently stores data and is readable by a machine. Specific examples of the non-transitory computer-readable medium may include a CD, a DVD, a hard disk, a Blu-ray disc, a USB, a memory card, and a ROM.

While embodiments have been shown and described, the disclosure is not limited to the aforementioned specific embodiments, and it is apparent that various modifications can be made by those having ordinary skill in the technical field to which the disclosure belongs, without departing from the gist of the disclosure as claimed by the appended claims. Also, it is intended that such modifications are not to be interpreted independently from the technical idea or prospect of the disclosure.

What is claimed is:

1. A display apparatus comprising:
    a power supply;
    a main body defining a space within the display apparatus configured to individually accommodate a speaker or a wireless power transmitter;
    a connection interface provided in the space; and
    a processor configured to:
        identify whether a device connected to the connection interface comprises the speaker or the wireless power transmitter,
        based on the device being identified as comprising the speaker, provide power supplied from the power supply and a sound signal to the speaker, and
        based on the device being identified as comprising the wireless power transmitter, provide power supplied from the power supply to the wireless power transmitter,
    wherein a size of the speaker and a size of the wireless power transmitter each corresponds to a size of the space.

2. The display apparatus according to claim 1, further comprising a communication interface,
    wherein the processor is configured to:
        based on the device being identified as comprising the wireless power transmitter, control the communication interface to perform a pairing operation with an external speaker apparatus, and
        control the communication interface to transmit the sound signal to the external speaker apparatus.

3. The display apparatus according to claim 2, wherein the wireless power transmitter comprises a resonator and is configured to transmit power supplied from the power supply to a wireless power receiver of the external speaker apparatus using the resonator.

4. The display apparatus according to claim 3, wherein the resonator comprises a first helical inductor and a second helical inductor,
    wherein a coil of the first helical inductor is wound in a first direction and is connected to the second helical inductor, and
    wherein a coil of the second helical inductor is wound in a second direction that is different from the first direction.

5. The display apparatus according to claim 3, wherein the resonator comprises a magnetic body that exposes an exposed area of the resonator, and
   wherein the resonator is attached to the display apparatus so that the exposed area is exposed outside of the display apparatus.

6. The display apparatus according to claim 1, wherein each of the speaker and the wireless power transmitter comprises an interface compatible with the connection interface, and
   wherein the processor is further configured to, based on the speaker being detached from the connection interface and the wireless power transmitter being connected to the connection interface, control the connection interface to provide power for driving the speaker supplied from the power supply to the wireless power transmitter.

7. The display apparatus according to claim 6, further comprising a communication interface,
   wherein the processor is further configured to, based on a signal indicating attachment of the wireless power transmitter being received, control the communication interface to perform a pairing operation with an external speaker apparatus and transmit the sound signal to the external speaker apparatus.

8. The display apparatus according to claim 1, wherein the connection interface comprises a first connection interface and a second connection interface, and
   wherein the processor is further configured to, based on a first wireless power transmitter and a second wireless power transmitter being connected to the first connection interface and the second connection interface, respectively, provide a first power supplied from the power supply to the first wireless power transmitter and provide a second power to the second wireless power transmitter.

9. The display apparatus according to claim 8, wherein a first resonator provided in the first wireless power transmitter comprises a first helical inductor and a second helical inductor,
   wherein a coil of the first helical inductor is wound in a first direction and is connected to a coil of the second helical inductor,
   wherein the coil of the second helical inductor is wound in a second direction that is different from the first direction,
   wherein a second resonator provided in the second wireless power transmitter comprises a third helical inductor and a fourth helical inductor,
   wherein a coil of the third helical inductor is wound in the second direction and is connected to a coil of the fourth helical inductor,
   wherein the coil of the fourth helical inductor is wound in the first direction, and
   wherein magnetic flux directions of the first resonator and the second resonator are different from each other.

10. The display apparatus according to claim 9, wherein the processor is further configured to transmit a clock signal to the first wireless power transmitter to control driving timing of the first wireless power transmitter and the second wireless power transmitter.

11. The display apparatus according to claim 1, wherein the display apparatus further comprises a button corresponding to the space, and
   wherein the display apparatus is configured to, based on the button being manipulated, release the device attached from the space.

12. The display apparatus according to claim 1, further comprising a communication interface,
   wherein the processor is configured to, based on the device being identified as the wireless power transmitter while an internal speaker is also connected to the connection interface, inactivate the internal speaker, and control the connection interface to provide power for driving an external speaker apparatus to the wireless power transmitter and control the communication interface to transmit the sound signal to the external speaker apparatus.

13. A method for controlling a display apparatus, the method comprising:
   identifying a device connected to a connection interface provided within a space defined by a main body of the display apparatus that is configured to individually accommodate a speaker or a wireless power transmitter;
   identifying whether the device comprises the speaker or the wireless power transmitter;
   based on the device being identified as comprising the speaker, providing power and a sound signal to the speaker; and
   based on the device being identified as comprising the wireless power transmitter, providing power to the wireless power transmitter,
   wherein a size of the speaker and a size of the wireless power transmitter each corresponds to a size of the space.

14. The method according to claim 13, further comprising:
   based on the device being identified as comprising the wireless power transmitter, performing a pairing operation with an external speaker apparatus; and
   transmitting the sound signal to the external speaker apparatus.

15. The method according to claim 14, wherein the wireless power transmitter comprises a resonator, and
   wherein the method further comprises transmitting power to a wireless power receiver of the external speaker apparatus using the resonator.

16. The method according to claim 15, wherein the resonator comprises a first helical inductor and a second helical inductor,
   wherein a coil of the first helical inductor is wound in a first direction and is connected to the second helical inductor, and
   wherein a coil of the second helical inductor is wound in a second direction that is different from the first direction.

17. The method according to claim 15, wherein the resonator comprises a magnetic body that exposes an exposed area of the resonator, and
   wherein the resonator is attached to the display apparatus so that the exposed area is exposed outside of the display apparatus.

18. The method according to claim 13, wherein the providing power to the wireless power transmitter comprises:
   based on the speaker being detached from the display apparatus and the wireless power transmitter being connected to the display apparatus, providing power for driving the speaker to the wireless power transmitter.

19. The method according to claim 18, further comprising based on a signal indicating attachment of the wireless power transmitter being received, performing a pairing operation with an external speaker apparatus and transmitting the sound signal to the external speaker apparatus.

20. The method according to claim 13, further comprising identifying whether another wireless power transmitter is connected to the display apparatus; and
- based on the another wireless power transmitter being identified as being connected, providing power to the another wireless power transmitter.

\* \* \* \* \*